US007591749B2

(12) United States Patent
Diemer et al.

(10) Patent No.: US 7,591,749 B2

(45) Date of Patent: Sep. 22, 2009

(54) ELECTRICALLY VARIABLE TRANSMISSION WITH ONE OR MORE OFF-AXIS MOTOR/GENERATORS

(75) Inventors: John A. Diemer, Farmington Hills, MI (US); Tejinder Singh, Canton, MI (US); Richard A. Pashnik, Saline, MI (US); Boris I. Burgman, Oak Park, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 442 days.

(21) Appl. No.: 11/532,316

(22) Filed: Sep. 15, 2006

(65) Prior Publication Data

US 2008/0070733 A1 Mar. 20, 2008

(51) Int. Cl.
*F16H 3/72* (2006.01)

(52) U.S. Cl. ........................................................ 475/5

(58) Field of Classification Search ..................... 475/5
See application file for complete search history.

(56) References Cited

U.S. PATENT DOCUMENTS 3,367,438 A * 2/1968 Moore ...................... 180/65.2
3,732,751 A * 5/1973 Berman et al. ................. 475/2
4,588,040 A * 5/1986 Albright et al. ............. 180/165
5,492,189 A * 2/1996 Kriegler et al. ............ 180/65.2
5,669,842 A * 9/1997 Schmidt ........................ 475/5
6,209,672 B1 * 4/2001 Severinsky ................. 180/65.2
6,387,007 B1 * 5/2002 Fini, Jr. ...................... 475/268
6,557,656 B2 * 5/2003 Haniu et al. .............. 180/65.6
6,695,736 B2 * 2/2004 Takenaka ....................... 475/5
6,715,291 B1 * 4/2004 Liao ........................... 60/698
6,715,572 B2 * 4/2004 Shimabukuro et al. ..... 180/65.6
7,314,421 B2 * 1/2008 Kim ............................. 475/5
7,392,871 B2 * 7/2008 Severinsky et al. ......... 180/65.2

* cited by examiner

*Primary Examiner*—Dirk Wright

(57) ABSTRACT

The present invention provides an electrically variable transmission for a hybrid vehicle. The electrically variable transmission includes a transmission input shaft defining a first axis of rotation, and a transmission output shaft defining a second axis of rotation. A first motor/generator is operatively connected to the transmission input shaft and is configured to rotate about a third axis of rotation for improved packaging. A second motor/generator is operatively connected to the transmission input shaft and is configured to rotate about the first axis of rotation.

15 Claims, 2 Drawing Sheets

ELECTRICALLY VARIABLE TRANSMISSION WITH ONE OR MORE OFF-AXIS MOTOR/GENERATORS

TECHNICAL FIELD

The present invention pertains generally to an electrically variable transmission with one or more off-axis motor/generators.

BACKGROUND OF THE INVENTION

A conventionally electrically variable transmission (EVT) includes two electric machines such as electric motor/generators which are located on the transmission input axis. Locating the two electric machines on the transmission input axis significantly limits the packaging design flexibility of such machines, particularly for front wheel drive applications.

SUMMARY OF THE INVENTION

The present invention provides an electrically variable transmission for a hybrid vehicle. The electrically variable transmission includes a transmission input shaft defining a first axis of rotation, and a first motor/generator is operatively connected to the second axis of rotation. A first motor/generator is operatively connected to the transmission input shaft and is configured to rotate about a third axis of rotation for improved packaging. A second motor/generator is operatively connected to the transmission input shaft and is configured to rotate about the first axis of rotation.

According to an alternate embodiment of the present invention, both the first and second motor/generators may be located on a common axis that is distinct from the first axis of rotation.

According to another alternate embodiment of the present invention, both the first and second motor/generators may be located on separate axes that are distinct from the first axis of rotation.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
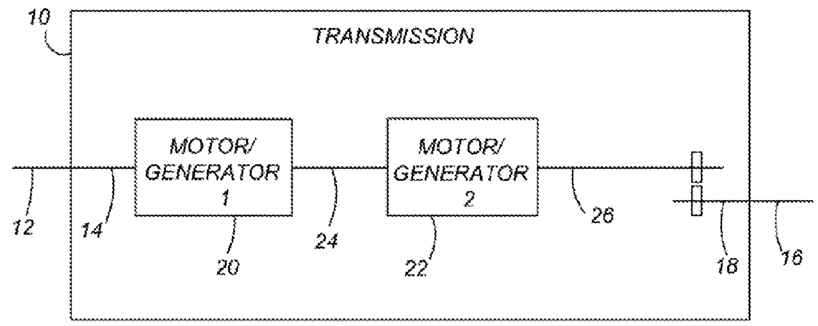
FIG. 1 is a schematic illustration of a conventional hybrid vehicle transmission.

Referring to FIG. 1*a*, a schematic illustration of a conventional hybrid vehicle transmission 10 is shown. The transmission 10 includes an input shaft 12 which defines an input axis or first axis 14, and an output shaft 16 which defines an output axis or second axis 18. The transmission 10 also includes a first motor/generator 20 and a second motor/generator 22. The first and second motor/generators 20, 22 respectively include an input/output shaft 24, 26 that is configured to rotate about the transmission input axis 14. The first and second motor/generators 20, 22 are referred to as "on-axis" motor/generators because their input/output shafts 24, 26 each define an axis of rotation that is common with the transmission input axis 14. Conventional hybrid vehicle transmissions with multiple on-axis motor/generators generally have limited available space along the transmission input axis 14. This is especially true with front wheel drive applications wherein packaging considerations for on-axis motor/generators significantly limit motor/generator size.

Figure 2:
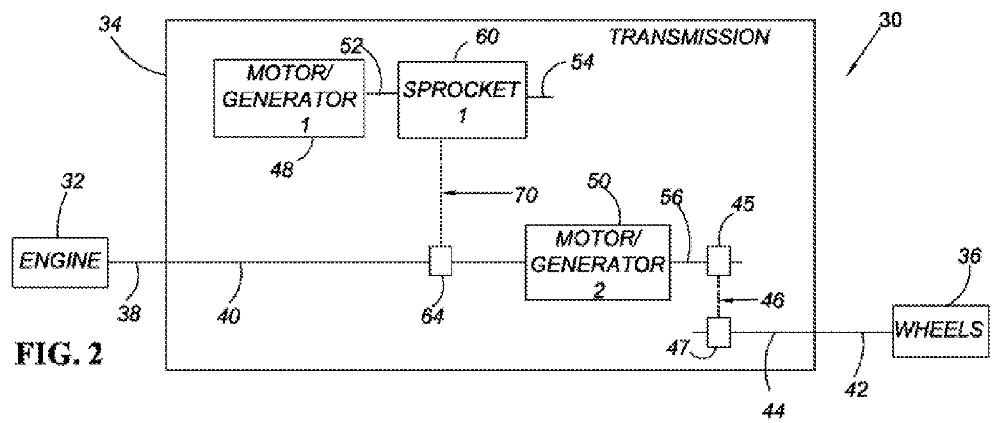
FIG. 2 is a schematic illustration of a hybrid vehicle in accordance with the preferred embodiment of the present invention.

Referring to FIG. 2, a schematic illustration of a hybrid vehicle 30 in accordance with the preferred embodiment of the present invention is shown. The hybrid vehicle 30 includes an engine 32, a transmission 34, and a plurality of wheels 36. The transmission 34 receives input from the engine 32 via an input shaft 38. The input shaft 38 defines an input axis or first axis 40 for the transmission 34. The transmission 34 transfers output to the wheels 36 via an output shaft 42. The output shaft 42 defines an output axis or second axis 44 for the transmission 34. The input axis 40 and output axis 44 are generally separate and distinct from each other but may, in some applications, be the same axis. The input shaft 38 includes a gear member 45, and the output shaft 42 includes a gear member 47 aligned relative to the gear member 45. The input shaft 38 and the output shaft 42 are preferable coupled with a chain 46 disposed between the gear members 45 and 47. Alternatively, the input and output shafts 38, 42 may be coupled in any known manner such as with directly interconnected gear members or a belt.

The transmission 34 includes a first motor/generator 48 and a second motor/generator 50. The first motor/generator 48 includes an input/output shaft 52 that rotates about a third axis 54, and the second motor/generator 50 preferably includes an input/output shaft 56 that rotates about the first axis 40. A sprocket 60 is connected to the input/output shaft 52 of the first motor/generator 48, and a gear member 64 is connected to the transmission input shaft 38 in alignment with the sprocket 60. A chain 70 operatively connects the sprocket 60 and the gear member 64 in order to couple the input/output shaft 52 with the transmission input shaft 38. Alternatively, the input/output shaft 52 and the transmission input shaft 38 may be coupled in any known manner such as with a belt and pulley apparatus (not shown). The input/output shaft 56 of the second motor/generator 50 is directly coupled to the transmission input shaft 38 in a conventional manner. Alternatively, the second motor/generator 50 may include a rotor (not shown) which is directly coupled to the transmission input shaft 38.

The first motor/generator 48 is an "off-axis" motor/generator because its input/output shaft 52 defines an axis of rotation that is distinct from the transmission input axis 40. The second motor/generator 50 is an "on-axis" motor/generator because its input/output shaft 56 defines an axis of rotation that is common with the transmission input axis 40. The off-axis motor/generator 48 and on-axis motor/generator 50 together require less space along the transmission input axis 40 than a conventional designs incorporating two on-axis motor/generators. Therefore, the transmission 34 is easier to package in hybrid vehicle applications having limited available space along the transmission input axis 40 such as, for example, front wheel drive applications.

Figure 2A:
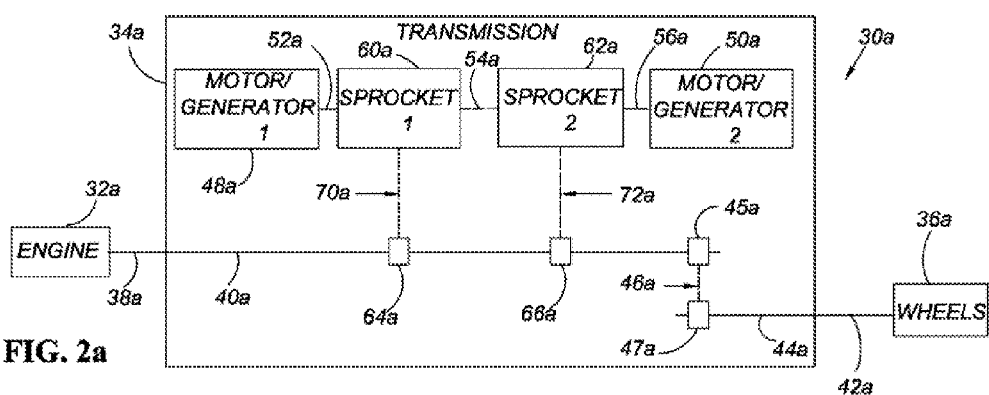
FIG. 2*a* is a schematic illustration of a hybrid vehicle in accordance with an alternate embodiment of the present invention.
Figure 2B:
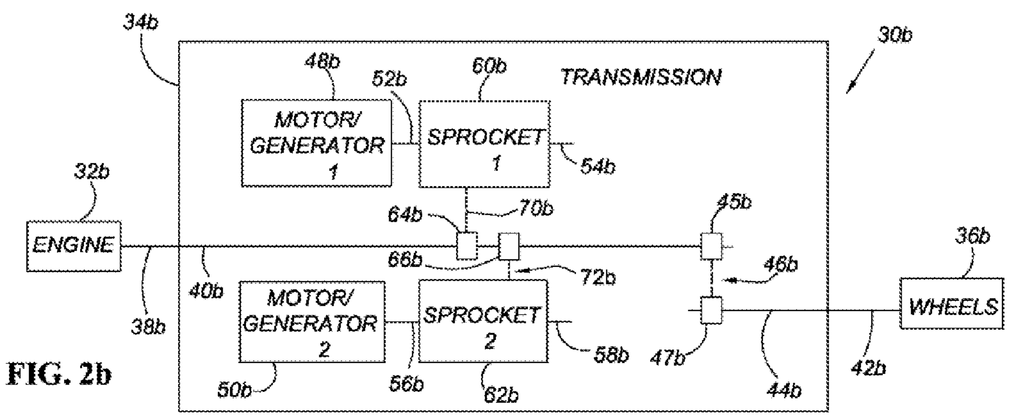
FIG. 2*b* is a schematic illustration of a hybrid vehicle in accordance with an alternate embodiment of the present invention.

FIGS. 2*a* and 2*b* illustrate two alternate embodiments of the present invention. Like reference numbers are used in FIGS 2*a* and 2*b* to refer to like components from FIG. 2. Additionally, the letters "a" and "b" added as a suffix to a reference numeral identifies a similar component in a different embodiment. As an example, the engine 32 of FIG. 2 functions similarly to the engines 32*a* and 32*b* of FIGS. 2*a* and 2*b* respectively. Therefore, unless specified otherwise, the components of FIGS. 2*a* and 2*b* identified with a base reference number followed by one of the letters "a" or "b" should be considered to be identical to a respective component of FIG. 2 identified with a common base reference number.

Referring to FIG. 2*a*, a schematic illustration of a hybrid vehicle 30*a* in accordance with an alternate embodiment of the present invention is shown. The hybrid vehicle 30*a* includes an engine 32*a*, a transmission 34*a*, and a plurality of wheels 36*a*. The transmission 34*a* receives input from the engine 32*a* via an input shaft 38*a*. The input shaft 38*a* defines an input axis or first axis 40*a* for the transmission 34*a*. The transmission 34*a* transfers output to the wheels 36*a* via an output shaft 42*a*. The output shaft 42*a* defines an output axis or second axis 44*a* for the transmission 34*a*. The input axis 40*a* and output axis 44*a* are generally separate and distinct from each other but may, in some application, be the same axis.

The transmission 34*a* includes a first motor/generator 48*a* and a second motor/generator 50*a*. The first motor/generator 48*a* includes an input/output shaft 52*a* tat rotates about a third axis 54*a*, and the second motor/generator 50*a* includes an input/output shaft 56*a* that also rotates about the third axis 54*a*. Therefore, the motor/generators 48*a*, 50*a* are both off-axis motor/generators which share a common axis of rotation (i.e., the third axis 54*a*). A first sprocket 60*a* is connected to the input/output shaft 52*a* of the first motor/generator 48*a*, and second sprocket 62*a* is connected to the input/output shaft 56*a* of the second motor/generator 50*a*. Gear members 64*a*, 66*a* are connected to the transmission input shaft 38*a* and are respectively aligned with the first and second sprockets 60*a*, 62*a*. A first chain 70*a* operatively connects the first sprocket 60*a* and the gear member 64*a* in order to couple the input/output shaft 52*a* with the transmission input shaft 38*a*. A second chain 72*a* operatively connects the second sprocket 62*a* and the gear member 66*a* in order to couple the input/output shaft 56*a* with the transmission input shaft 38*a*.

Referring to FIG. 2*b*, a schematic illustration of a hybrid vehicle 30*b* in accordance with another alternate embodiment of the present invention is shown. The hybrid vehicle 30*b* includes an engine 32*b*, a transmission 34*b*, and a plurality of wheels 36*b*. The transmission 34*b* receives input from the engine 32*b* via an input shaft 38*b*. The input shaft 38*b* defines an input axis or first axis 40*b* for the transmission 34*b*. The transmission 34*b* transfers output to the wheels 36*b* via an output shaft 42*b*. The output shaft 42*b* defines an output axis or second axis 44*b* for the transmission 34*b*. The input axis 40*b* and output axis 44*b* are generally separate and distinct from each other but may, in some applications, be the same axis.

The transmission 34*b* includes a first motor/generator 48*b* and a second motor/generator 50*b*. The first motor/generator 48*b* includes an input/output shaft 52*b* that rotates about a third axis 54*b*, and the second motor/generator 50*b* includes an input/output shaft 56*b* that rotates about a fourth axis 58*b*. Therefore, the motor/generators 48*b*, 50*b* are both off-axis motor/generators with separate axes of rotation (i.e., third and fourth axes 54*b*, 58*b*, respectively). In all other respects, the transmission 30*b* functions similarly to the transmission 30*a* (shown in FIG. 2*a*).

Referring now to FIGS. 2, 2*a* and 2*b* it can be seen that, because of the incorporation of at least one off-axis motor/generator, the transmissions 30, 30*a* and 30*b* require less space along their respective transmission input axis than conventional dual on-axis motor/generator designs. Additionally, the transmissions 30, 30*a* and 30*b* are each packaged in a slightly different manner in order to provide additional packaging flexibility such that the needs of a particular application can best be met.

Figure 3:
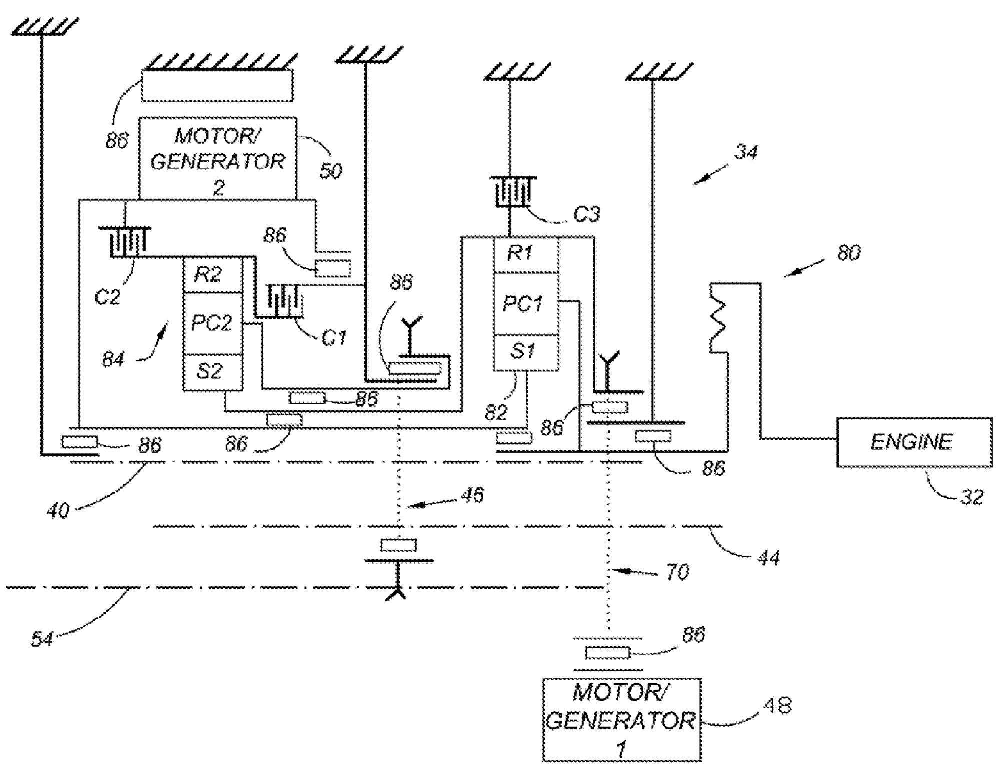
FIG. 3 is a stick diagram illustrating the electrically variable transmission of FIG. 2 in more detail.

Referring to FIG. 3, a stick diagram shows the transmission 34 of FIG. 2 in more detail. Like references numbers are used in FIG. 3 to refer to like components from FIG. 2. It should be appreciated that the transmission 34 is shown for illustrative purposes, and that the preferred embodiment of the present invention which incorporates one off-axis motor/generator 48 and one on-axis motor/generator 50 may be implemented with alternate transmission configurations.

The transmission 34 is shown operatively connected to the engine 32 via a damper 80. The transmission 34 includes a first planetary gear set 82, a second planetary gear set 84, and three clutches C1-C3. The first planetary gear set 82 includes a ring member R1, a planet carrier PC1 and a sun member S1. The second planetary gear set 84 includes a ring member R2, a planet carrier PC2 and a sun member S2. A plurality of bushings or bearings 86 are implemented to facilitate relative rotation between transmission components.

The first motor/generator 48 is configured to rotate about the third axis 54. The chain 70 permanently connects the first motor/generator 48 with the ring member R1 and the sun member S2. Engagement of the third clutch C3 grounds the first motor/generator 48 such that the first motor/generator 48 is locked or held stationary. The second motor/generator 50 is configured to rotate about the first axis 40. The second motor/generator 50 is permanently connected to the sun member S1. Engagement of the second clutch C2 connects the second motor/generator 50 to the ring member R2, and engagement of both the first and second clutches C1, C2, grounds the second motor/generator 50 such that the second motor/generator 50 is locked or held stationary. Output from the planet carrier PC2 is transferred to the second axis of rotation 44 via chain 46 in order to drive the wheels 36 (shown in FIG. 2).

While the best modes for carrying out the invention have been described in detail, those familiar with the art to which this invention relates will recognize various alternative designs and embodiments for practicing the invention within the scope of the appended claims.

The invention claimed is:

1. An electrically variable transmission for a hybrid vehicle comprising:

- a transmission input shaft defining a first axis of rotation;
- a transmission output shaft coupled with the input shaft, said transmission output shaft defining a second axis of rotation;
- a first motor/generator operatively connected to the transmission input shaft, said first motor/generator configured to rotate about a third axis of rotation which is spaced from the first axis of rotation for improved packaging; and
- a second motor/generator operatively connected to the transmission input shaft, said second motor/generator configured to rotate about the first axis of rotation.

2. The electrically variable transmission of claim 1, further comprising a first chain configured to operatively connect the first motor/generator with the transmission input shaft.

3. The electrically variable transmission of claim 2, further comprising a sprocket mounted to an input/output shaft of the first motor/generator; and a first gear member attached to the transmission input shaft such that the sprocket and gear member are operatively connected by the first chain.

4. The electrically variable transmission of claim 3, further comprising a second chain configured to couple the transmission input shaft and the transmission output shaft.

5. The electrically variable transmission of claim 4, further comprising a third gear member mounted to the transmission input shaft; and a fourth gear member mounted to the transmission output shaft such that the third and fourth gear members are operatively connected by the second chain.

6. An electrically variable transmission for a hybrid vehicle comprising:

a transmission input shaft defining a first axis of rotation;

a transmission output shaft coupled with the transmission input shaft, said transmission output shaft defining a second axis of rotation;

a first motor/generator operatively connected to the transmission input shaft, said first motor/generator configured to rotate about a third axis of rotation which is spaced from the first axis of rotation for improved packaging; and a second motor/generator operatively connected to the transmission input shaft, said second motor/generator configured to rotate about the third axis of rotation.

7. The electrically variable transmission of claim 6, further comprising a first chain configured to couple the first motor/generator with the transmission input shaft.

8. The electrically variable transmission of claim 7, further comprising a second chain configured to couple the second motor/generator with the transmission input shaft.

9. The electrically variable transmission of claim 8, further comprising a third chain configured to couple the transmission output shaft with the transmission input shaft.

10. An electrically variable transmission for a hybrid vehicle comprising:

a transmission input shaft defining a first axis of rotation;

a transmission output shaft coupled with the transmission input shaft, said transmission output shaft defining a second axis of rotation;

a first motor/generator operatively connected to the transmission input shaft, said first motor/generator configured to rotate about a third axis of rotation which is spaced from the first axis of rotation for improved packaging; and a second motor/generator operatively connected to the transmission input shaft, said second motor/generator configured to rotate about a fourth axis of rotation which is spaced from the first and third axes of rotation for improved packaging;

a first planetary gear set having a ring member, a planet carrier and a sun member; and a second planetary gear set having a ring member, a planet carrier and a sun member;

wherein said first motor/generator is operatively connected to the ring member of the first planetary gear set and to the sun member of the second planetary gear set; and wherein said second motor/generator is operatively connected to the sun member of the first planetary gear set.

11. The electrically variable transmission of claim 10, further comprising a first chain configured to couple the first motor/generator with the transmission input shaft.

12. The electrically variable transmission of claim 11, further comprising a second chain configured to couple the second motor/generator with the transmission input shaft.

13. The electrically variable transmission of claim 12, further comprising a third chain configured to couple the transmission output shaft with the transmission input shaft.

14. The electrically variable transmission of claim 10, further comprising a first clutch, a second clutch and a third clutch, wherein engagement of both the first clutch and the second clutch holds said second motor/generator stationary, wherein engagement of the second clutch connects said second motor/generator to the ring member of the of the second planetary gear set, and wherein engagement of the third clutch holds said first motor/generator stationary.

15. The electrically variable transmission of claim 10, wherein output from the planet carrier of the second planetary gear set is transferred to the second axis of rotation.

* * * * *